(12) United States Patent
Makino (10) Patent No.: US 11,347,196 B2
(45) Date of Patent: May 31, 2022

(54) CONTROLLER OF MACHINE TOOL

(71) Applicant: FANUC CORPORATION, Yamanashi (JP)

(72) Inventor: Iwao Makino, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 241 days.

(21) Appl. No.: 16/789,244

(22) Filed: Feb. 12, 2020

(65) Prior Publication Data
US 2020/0285214 A1 Sep. 10, 2020

(30) Foreign Application Priority Data

Mar. 6, 2019 (JP) .............................. JP2019-040498

(51) Int. Cl.
*G05B 19/19* (2006.01)
*G05B 19/4063* (2006.01)

(52) U.S. Cl.
CPC ......... *G05B 19/19* (2013.01); *G05B 19/4063* (2013.01); *G05B 2219/34465* (2013.01); *G05B 2219/49384* (2013.01)

(58) Field of Classification Search
CPC ............... G05B 19/19; G05B 19/4063; G05B 2219/34465; G05B 2219/49384; G05B 2219/37337; G05B 2219/49055; G05B 2219/49314; G05B 19/4155; B23Q 15/013; B23Q 1/72; B25J 9/00
See application file for complete search history.

(56) References Cited

U.S. PATENT DOCUMENTS 5,170,358 A * 12/1992 Delio ................. G05B 19/4163
173/2
2003/0110006 A1* 6/2003 Nakamura ........... G05B 19/406
702/176
(Continued)

FOREIGN PATENT DOCUMENTS

JP 2017-056515 A 3/2017
WO 2017/051745 A1 3/2017

OTHER PUBLICATIONS

E. Graham, M. Mehrpouya, S.S. Park, "Robust prediction of chatter stability in milling based on the analytical chatter stability," Journal of Manufacturing Processes, vol. 15, Issue 4, 2013, pp. 508-517, ISSN 1526-6125 (Year: 2013).*

*Primary Examiner* — Christopher E. Everett
(74) *Attorney, Agent, or Firm* — Studebaker & Brackett PC (57) ABSTRACT

A controller of a machine tool includes: a position command calculation unit which calculates a position command for relatively moving a workpiece and a tool; an oscillation operation execution determination unit which analyzes a machining program and which determines whether or not an oscillation operation of relatively oscillating the workpiece and the tool is performed in a machining block; an oscillation operation intermittent execution determination unit which determines, when it is determined that the oscillation operation is performed, in the machining block, based on the state of the machine tool, whether the oscillation operation is enabled or disabled so as to determine whether or not the oscillation operation is intermittently performed; an oscillation command calculation unit which calculates, when it is determined that the oscillation operation is enabled, an oscillation command for relatively oscillating the workpiece and the tool; and an adder which adds the position command and the oscillation command together.

6 Claims, 7 Drawing Sheets

(56) References Cited

U.S. PATENT DOCUMENTS

2014/0102268 A1* 4/2014 Hari ................ B23Q 1/34
 82/118
2017/0075337 A1* 3/2017 Kameta ............ G05B 19/35

* cited by examiner

CONTROLLER OF MACHINE TOOL

This application is based on and claims the benefit of priority from Japanese Patent Application No. 2019-040498, filed on 6 Mar. 2019, the content of which is incorporated herein by reference.

BACKGROUND OF THE INVENTION

Field of the Invention

The present invention relates to a controller of a machine tool which performs oscillation machining.

Related Art

When a workpiece is machined with a tool of a machine tool, if chips are continuously generated, the chips may become entangled in the tool. In such a case, it is necessary to stop the machine tool in order to remove the chips from the tool, and thus it takes much time, with the result that the production efficiency thereof is lowered. Furthermore, the chips may damage the workpiece, and thus the quality of the workpiece may be lowered.

In this respect, for example, oscillation machining is known in which the tool and the workpiece are relatively oscillated in the direction of machining (oscillation operation), and in which thus the chips are subdivided (see, for example, Patent Documents 1 and 2). The controller of the machine tool which performs the oscillation machining (oscillation operation) provides a sinusoidal (or cosine wave-shaped) feed command to a servo motor for a feed axis that feeds the tool or the workpiece in the direction of the machining, and thereby relatively oscillates the tool and the workpiece in the direction of the machining.

Patent Document 1: Japanese Unexamined Patent Application, Publication No. 2017-56515

Patent Document 2: PCT International Publication No. WO2017/051745

SUMMARY OF THE INVENTION

In the oscillation operation as described above, for example, a sinusoidal (or cosine wave-shaped) oscillation command is superimposed on a position command, and thus a variation in acceleration is produced, with the result that a burden on the machine tool is increased. In this respect, it can be considered that in the oscillation operation, the number of times oscillation is performed is reduced.

The setting of the enabling/disabling of an oscillation operation with a machining program command is made in each of blocks of a machining program. For example, when the machining program includes a machining block (for example, a cutting block) and a non-machining block (for example, a rapid traverse block), the oscillation operation is set to be enabled in the machining block, and the oscillation operation is set to be disabled in the non-machining block. In other words, during the machining block, the enabling/disabling (on/off) of the oscillation operation cannot be switched.

Hence, in a controller of a machine tool, it is desired to switch the enabling/disabling of an oscillation operation in a machining block of a machining program so as to reduce the number of times oscillation is performed.

A controller of a machine tool according to the present disclosure which machines, while relatively oscillating a workpiece and a tool, the workpiece so as to subdivide chips generated in the machining includes: a position command calculation unit which calculates a position command for relatively moving the workpiece and the tool; an oscillation operation execution determination unit which analyzes a machining program for machining the workpiece and which determines whether or not an oscillation operation of relatively oscillating the workpiece and the tool is performed in a machining block of the machining program; an oscillation operation intermittent execution determination unit which determines, when the oscillation operation execution determination unit determines that the oscillation operation is performed, in the machining block of the machining program, based on the state of the machine tool, whether the oscillation operation is enabled or disabled so as to determine whether or not the oscillation operation is intermittently performed; an oscillation command calculation unit which calculates, when the oscillation operation intermittent execution determination unit determines that the oscillation operation is enabled, an oscillation command for relatively oscillating the workpiece and the tool; and an adder which adds the position command and the oscillation command together.

According to the present disclosure, in a controller of a machine tool, it is possible to switch the enabling/disabling of an oscillation operation in a machining block of a machining program so as to reduce the number of times oscillation is performed.

DETAILED DESCRIPTION OF THE INVENTION

Examples of the embodiment of the present invention will be described below with reference to accompanying drawings. In the drawings, the same or corresponding parts are identified with the same reference numerals.

First Embodiment

Figure 1:
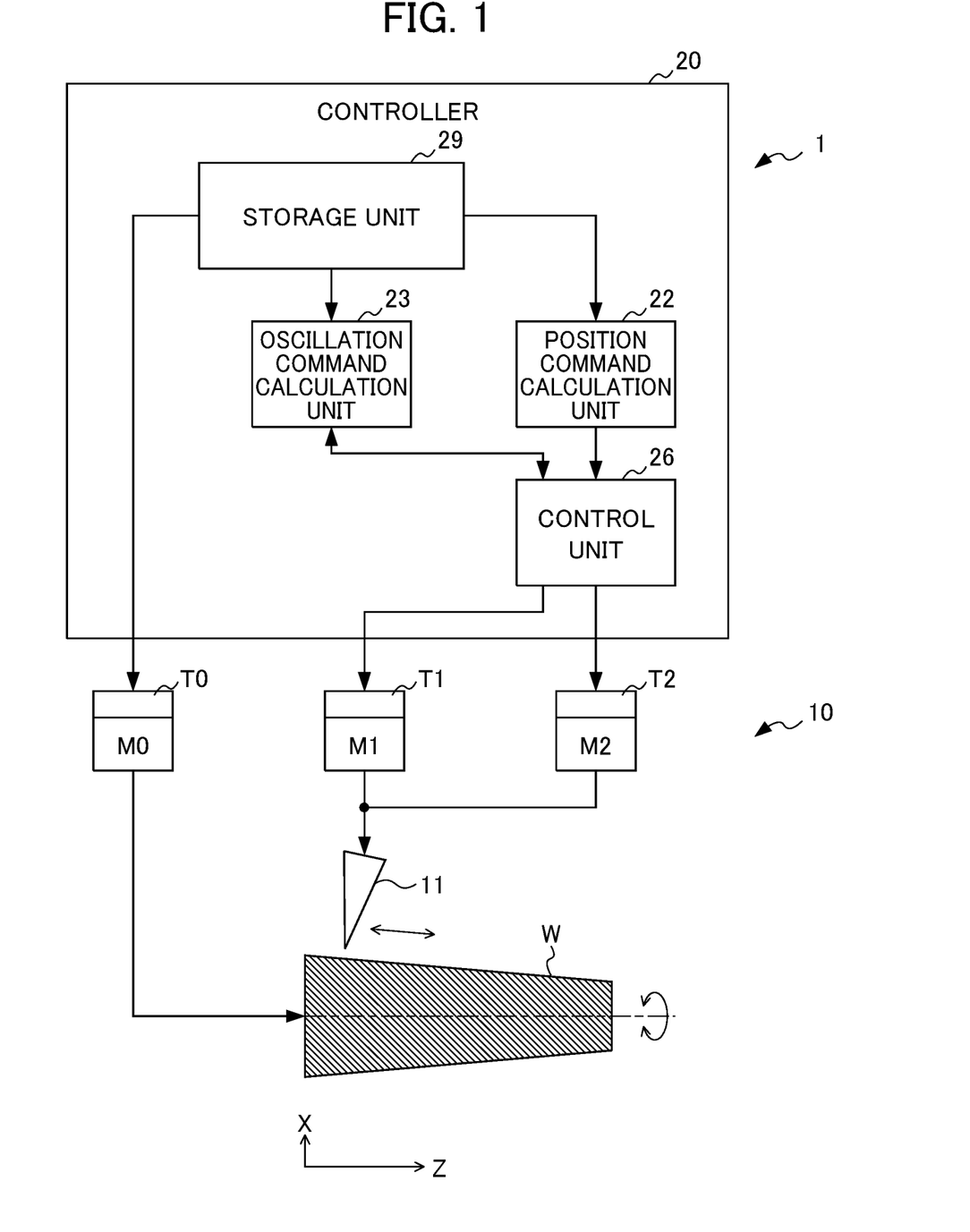
FIG. 1 is a diagram schematically showing the configuration of a machining system which includes a controller of a machine tool according to the present embodiment.
Figure 2:
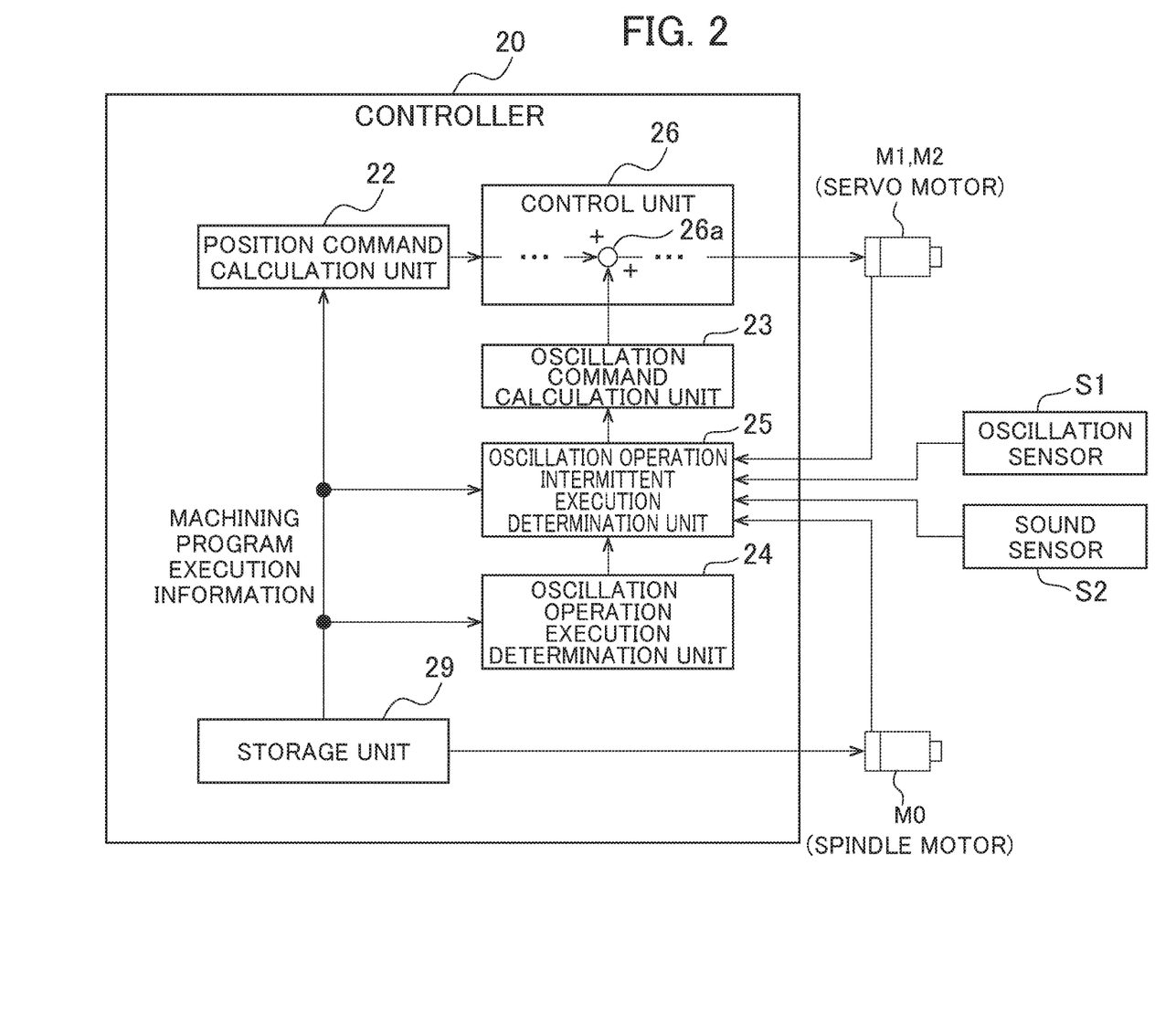
FIG. 2 is a diagram showing the configuration of the controller of the machine tool according to the present embodiment.

FIG. 1 is a diagram schematically showing the configuration of a machining system which includes a controller of a machine tool according to a first embodiment, and FIG. 2 is a diagram showing the configuration of the controller of the machine tool according to the first embodiment. In FIG. 1, only main portions of the controller of the machine tool shown in FIG. 2 are shown. The machining system 1 shown in FIG. 1 includes the machine tool 10 and the controller 20 which controls the machine tool 10.

The machine tool 10 includes a tool 11. The tool 11 performs turning on a workpiece W which has, for example, a tubular shape, a cylindrical shape, a conical shape or a truncated conical shape. In the example of FIG. 1, the tool 11 performs turning on the outer circumferential surface of the workpiece W. In the example of FIG. 1, it is assumed that the center axis line of the workpiece serving as the rotation axis of the workpiece W is a Z axis and that an axis line perpendicular to the Z axis is an K axis.

The machine tool 10 can machine not only a workpiece whose shape in a direction along the Z axis is linear but also a workpiece whose shape in the direction is arc-shaped. The machine tool 10 can machine not only the outer circumferential surface of a workpiece but also the inner circumferential surface of a tubular workpiece. The machine tool 10 can perform not only turning but also machining such as cutting, grinding or polishing.

The machine tool 10 includes a spindle M0 and two feed axes M1 and M2 which perform a coordinated operation with the spindle M0. The spindle M0 includes a spindle motor, and the feed axes M1 and M2 include a servo motor. The spindle 110 and the feed axes M1 and M2 are controlled by the controller 20.

The spindle M0 rotates the workpiece W about the center axis line (Z axis) of the workpiece. The feed axis M1 can both feed the tool 11 in the direction of the Z axis (first direction) and reciprocate the tool 11 in the direction of the Z axis, that is, make the tool 11 oscillate. The feed axis M2 can both feed the tool 11 in the direction of the X axis (second direction) and reciprocate the tool 11 in the direction of the X axis, that is, make the tool 11 oscillate.

When turning is performed on the workpiece which has a cylindrical shape or a tubular shape, the workpiece W is rotated about the center axis line (Z axis) of the workpiece, and the tool 11 is fed in only the direction of the Z axis (in this case, the direction of the machining) along the generatrix of the outer circumferential surface of the workpiece.

On the other hand, when turning is performed on a workpiece, such as a workpiece having a conical shape, a truncated conical shape or an arc shape, whose outside diameter differs in the direction of the Z axis, the workpiece W is rotated about the center axis line (Z axis) of the workpiece, and the tool 11 is fed in an oblique direction (combined direction of the direction of the Z axis and the direction of the X axis) (in this case, the direction of the machining) along the generatrix of the outer circumferential surface of the workpiece. In this case, since the tool 11 is fed in the oblique direction along the generatrix of the outer circumferential surface of the workpiece W, at least two feed axes M1 and M2 are needed. Both the feed axis M1 and the feed axis M2 are controlled, and thus the tool 11 is fed in the oblique direction along the generatrix of the outer circumferential surface of the workpiece W.

The controller 20 is formed with a computer that includes a memory such as a ROM (read only memory) and a RAM (random access memory), a CPU (control processing unit) and a communication control unit which are connected to each other through a bus. The controller 20 further includes: a position command calculation unit 22; an oscillation command calculation unit 23; a control unit 26 (which includes an adder 26a); and a storage unit 29, and the functions or operations of the individual units thereof can be achieved by the coordination of the CPU and the memory incorporated in the computer and a control program stored in the memory.

In the storage unit 29, machining conditions for the workpiece W and the like are stored. The machining conditions for the workpiece W include: the relative rotation speeds of the workpiece W and the tool 11 about the center axis line of the workpiece W; the relative feedrates of the tool 11 and the workpiece W; and position commands for the feed axes M1 and M2.

A high-level computer (not shown) such as a CNC (Computer Numerical Controller) or a PLC (Programmable Logic Controller) is connected to the controller 20, and the rotation speeds, the feedrates and the like described above may be input from the high-level computer to the storage unit 29. The storage unit 29 or the position command calculation unit 22 may be included not in the controller 20 but in the high-level computer.

The storage unit 29 may store a machining program which is executed by the machine tool 10, and the CPU (not shown) within the controller 20 may read, from the machining program, the rotation speeds and the feedrates described above as the machining conditions so as to output them to the position command calculation unit 22, the oscillation command calculation unit 23 or the control unit 26.

The position command calculation unit 22 calculates a position command which relatively moves the workplace W and the tool 11. Specifically, the position command calculation unit 22 has the function of calculating, based on the relative rotation speeds of the workpiece W and the tool 11 about the center axis line of the workpiece W and the relative feedrates of the tool 11 and the workpiece W, the position commands (movement commands) for the feed axes M1 and M2. The position commands indicate a target position to the control unit 26 when the tool 11 and the workpiece W are relatively fed in a direction. (direction of the machining) along the generatrix of the outer circumferential surface of the workpiece W.

The oscillation command calculation unit. 23 calculates an oscillation command for relatively oscillating the workpiece W and the tool 11. Specifically, the oscillation command calculation unit 23 calculates, based on the rotation speed and the feedrate described above, the oscillation command for the feed axis M1 such that an oscillation frequency is a positive non-integral multiple of the rotation speed described above and that the tool 11 performs intermittent cutting on the workpiece W. The oscillation command is a periodic command which is calculated so as to be asynchronous with the rotation speed about the center axis line described above, and includes the oscillation frequency and an oscillation amplitude. The value of the term of S/60×I in formula (1) for the oscillation command which will be described later corresponds to the oscillation frequency, and the value of the term of K×F/2 in formula (1) corresponds to the oscillation amplitude. The details of the oscillation command calculation unit 23 will be described later.

The intermittent cutting described above means that turning is performed on the workpiece W while the tool 11 is being brought into contact with and separated from the workpiece W in a periodic manner, and is also referred to as oscillation cutting or vibration cutting. Although in FIG. 1, the workpiece W is rotated, and simultaneously, the tool 11 oscillates with respect to the workpiece W, the tool 11 may be rotated about the center axis line of the workpiece W, and simultaneously, the workpiece W may oscillate with respect to the tool 11. Although in FIG. 1, each of the feed axes M1 and M2 performs both the feed operation and the oscillation operation on the workpiece W, the feed operation and the oscillation operation on the workplace W may be performed with separate feed axes, respectively.

The control unit 26 includes the adder 26a so as to add the position command and the oscillation command together. Specifically, the control unit 26 has the function of controlling the feed axes M1 and M2 by calculating a torque command based on a combined command (for example, a position command value) obtained by adding the oscillation command described above to a position error which is a difference between the position commands described above and the actual positions of the feed axes M1 and M2. The actual positions of the feed axes M1 and M2 correspond to position feedback values obtained by position detection units (not shown) such as encoders incorporated in the feed axes M1 and M2.

Figure 3:
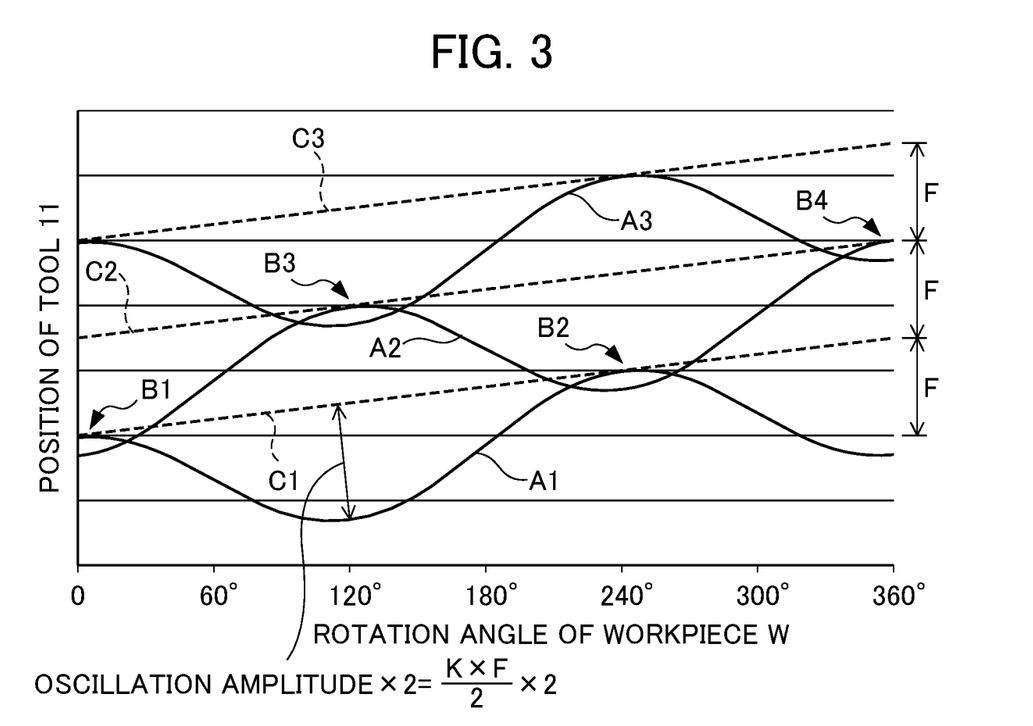
FIG. 3 is a diagram showing a relationship between a feed amount and a rotation angle in an oscillation operation.

The details of the oscillation command calculation unit 23 will be described below. FIG. 3 is a diagram showing a relationship between a feed amount and a rotation angle. In FIG. 3, a horizontal axis represents the rotation angle of the workpiece W, and a vertical axis represents the feed amount of the tool 11 in the direction of the machining (that is, a direction along the generatrix of the outer circumferential surface of the workpiece W in FIG. 1). In FIG. 3, a plurality of linear broken lines C1, C2, C3, . . . which are obliquely extended are shown. As is found from FIG. 3, the vertical axis coordinates of an intersection between the broken line C1 and the vertical axis correspond to vertical axis coordinates at the start point of the subsequent, broken line C2. Likewise, the vertical axis coordinates of an intersection between the broken line C2 and the vertical axis correspond to vertical axis coordinates at the start point of the subsequent broken line C3. These linear broken lines C1, C2, C3, . . . indicate the path of the tool 11 in the workpiece W when the oscillation command is not present. On the other hand, curves A1, A2 and A3, . . . shown in FIG. 3 indicate the path of the tool 11 on the workpiece W when the oscillation command is present. In other words, it is assumed that the broken lines C1, C2, C3 and the like indicate only the position commands (original command values) before the addition of the oscillation command and that the curves A1, A2, A3 and the like indicate the position commands after the addition of the oscillation command. Hence, the curves A1, A2 and A3 indicate commands which are obtained by adding the cosine wave-shaped oscillation command to each of the position commands indicated by the broken lines Cc, C2 and C3.

The curve A1 is the path of the tool 11 in the first revolution of the workpiece W, the curve A2 is the path of the tool 11 in the second revolution of the workpiece W and the curve A3 is the path of the tool 11 in the third revolution of the workpiece W. For simplification, the paths of the tool 11 in the fourth and subsequent revolutions of the workpiece W are not shown.

The oscillation command calculation unit 23 calculates oscillation commands as follows. The oscillation command calculation unit 23 determines a cosine wave-shaped oscillation frequency in order to calculate commands such as the curves A1, A2 and A3 in which the broken lines C1, C2 and C3 that are the position commands for the feed axes M1 and M2 calculated by the position command calculation unit 22 are respectively reference axis lines. The value of the term of S/60×I in formula (1) which will be described later is the oscillation frequency.

When the oscillation frequency described above is determined, as shown in FIG. 3, the initial phase of the cosine wave-shaped curve A2 in which a certain broken line, for example, the broken line C2 is the reference axis line is preferably displaced a half period with respect to the cosine wave-shaped curve A1 in which the preceding broken line, for example, the broken line C1 is the reference axis line. The reason thereof is that when the reference axis line is displaced a half period, the oscillation amplitude of the oscillation command can be minimized and that consequently, it is possible to most efficiently subdivide chips.

The oscillation command calculation unit 23 determines the oscillation amplitude of the oscillation command described above in order to calculate the commands such as the curves A1, A2 and A3 in which the broken lines C1, C2 and C3 are respectively reference axis lines. The value of the term of K×F/2 in formula (1) which will be described later is the oscillation amplitude. The curve A1 and the curve A2 shown in overlap each other in a part B1 where the rotation angle is about 0 degrees and a part B2 where the rotation angle is about 240 degrees. As is found from FIG. 3, in the parts B1 and B2, the maximum value of the curve A1 with respect to the broken line C1 is larger than the minimum value of the curve A2 with respect to the broken line C2. In other words, the oscillation command calculation unit 23 preferably determines the oscillation amplitude such that the preceding curve A1 and the subsequent curve A2 partially overlap each other. In the curves A1, A2 and A3, the feedrates are constant, and thus the oscillation amplitudes of the oscillation commands are all the same.

In the overlapping parts B1 and B2, the workpiece W is separated when the tool 11 performs machining in the path of the curve A2, and thus the workpiece W is prevented from being machined. In the present embodiment, the overlapping parts B1 and B2 as described above are periodically generated, and thus it is possible to perform so-called intermittent cutting. In an example shown in FIG. 3, a chip is generated in each of the parts B1 and B2 an operation corresponding to the curve A2. In other words, in the curve A2 of the second revolution, two chips are generated. The intermittent cutting as described above is periodically performed, and thus oscillation cutting can be performed.

Furthermore, the curve A3 which is formed with respect to the broken line C3 has the same shape as the curve A1. The curve A2 and the curve A3 overlap each other in a part B3 where the rotation angle is about 120° and a part B4 where the rotation angle is about 360°. A chip is generated in each of the parts B3 and B4 by an operation corresponding to the curve A3. In other words, in the curve A3 of the third revolution, two chips are generated. Thereafter, two chips are generated per revolution of the workpiece. However, in the first revolution, no chip is generated.

In this way, the oscillation frequency and the oscillation amplitude are determined, and thus the oscillation command calculation unit 23 within the control unit 26 calculates the oscillation command. For example, the oscillation command is indicated by formula (1) below.

[Math. 1]

$$\text{OSCILLATION COMMAND} = \frac{K \times F}{2} \cos\left(2\pi \times \frac{S}{60} \times I \times t\right) - \frac{K \times F}{2} \quad (1)$$

In formula (1), K represents an oscillation amplitude magnification, F represents the amount, of movement of the tool 11 per revolution of the workpiece W, that is, a feed amount per revolution [mm/rev], S represents the rotation speed of the workpiece W about the center axis line [min$^{-1}$] or [rpm] and I represents an oscillation frequency magnification. Here, the oscillation frequency described above corresponds to the term of S/60×I in formula (1), and the oscillation amplitude described above corresponds to the term of K×F/2 in formula (1). However, the oscillation amplitude magnification K is a number equal to or greater than one, and the oscillation frequency magnification I is a non-integer greater than zero (for example, a positive non-integer such as 0.5, 0.8, 1.2, 1.5, 1.9, 2.3 or 2.5. The oscillation amplitude magnification K and the oscillation frequency magnification I are constants (in the example shown in FIG. 3, I is 1.5).

The reason why the oscillation frequency magnification I is not set to an integer is that in the case of an oscillation frequency which is exactly equal to the number of revolutions of the workpiece W about the center axis line, the overlapping parts B1, B2, B3, B4 and the like described above cannot be generated, and that thus it is impossible to obtain the effect of shredding chips by oscillation cutting.

In formula (1), the oscillation command is a command in which the term of (K×F/2) is subtracted as an offset value with respect to a cosine wave where each of the broken lines C1, C2 and C3 indicating the position command is the reference axis line. Hence, the position path of the tool 11 based on a combined command value obtained by adding the oscillation command to the position command can be controlled with the assumption that the position of the tool 11 in the direction of the machining by the position command is an upper limit. Therefore, the curves A1, A2, A3 and the like in FIG. 3 are prevented from exceeding the broken lines C1, C2, C3 and the like in a positive direction (that is, the direction of the machining of the tool 11).

Furthermore, the oscillation command as indicated by formula (1) is provided, and thus as is found from the curved line A1 in FIG. 3, large oscillation is prevented from being produced at the machining start point (position of 0° in the horizontal axis) of the tool 11 in the direction of the feeding of the tool 11 from the beginning.

The initial values of the individual parameters (K and I in formula (1)) which are adjusted when the oscillation frequency and the oscillation amplitude are determined are assumed to be stored in the storage unit 29 before the operation of the machine tool 10. The rotation speed (S) of the workpiece W is previously stored in the storage unit 29 as the machining condition. The feed amount per revolution F is determined from the rotation speed (S) and the position command calculated by the position command calculation unit 22.

For example, when a workpiece machining shape is tubular or cylindrical, oscillation is performed along the direction of the machining which is the direction of the feed axis M1 (z axis) along the generatrix of the outer circumferential surface of the workpiece W. On the other hand, when the workpiece machining shape is conical or truncated conical (tapered) or when it includes an arc shape, for example, oscillation is performed along an oblique direction along the generatrix of the outer circumferential surface of the workpiece W, that is, the direction of the machining which is the combined direction of the direction of the feed axis M1 (Z axis) and the direction of the feed axis M2 (X axis).

As shown in FIG. 2, the controller 20 further includes an oscillation operation execution determination unit 24 and an oscillation operation intermittent execution determination unit 25.

The oscillation operation execution determination unit 24 analyzes the machining program so as to determine whether or not the oscillation operation described above is performed in a machining block of the machining program. For example, the machining program commands the oscillation operation in each of blocks. For example, the machining program commands the oscillation operation in a cutting block, and does not command the oscillation operation in a non-cutting block such as rapid traverse. In other words, the oscillation operation execution determination unit 24 determines, in each of the blocks of the machining program, whether or not the oscillation operation described above is performed.

When the oscillation operation execution determination unit 24 determines that the oscillation operation is performed, the oscillation operation intermittent, execution determination unit 25 determines, for example, in the cutting block, based on the state of the machine tool 10, whether the oscillation operation is enabled or disabled so as to determine whether or not the oscillation operation is intermittently performed. In this way, the oscillation operation intermittent execution determination unit 25 sets the start/completion of the oscillation operation in the cutting block. In other words, the oscillation operation intermittent execution determination unit 25 switches the enabling/disabling (on/off) of the oscillation operation in the cutting block.

When the state of the machine tool is not normal due to chips generated in the machining, for example, when chips continuously become entangled in the tool and thus normal turning is not performed, the oscillation operation intermittent execution determination unit 25 determines that the oscillation operation is enabled. On the other hand, when the state of the machine tool is normal, the oscillation operation intermittent execution determination unit 25 determines that the oscillation operation is disabled.

For example, the oscillation operation intermittent execution determination unit 25 determines the state of the machine tool 10 based on the feedback information of the servo motor or the spindle motor in the machine tool 10, the feedback information (detection oscillation) of an oscillation sensor S1 which detects the oscillation of the machine tool 10 or the feedback information (detection sound) of a sound sensor S2 which detects the sound of the machine tool 10.

For example, when chips continuously become entangled in the tool, the following are estimated:
the operation of the servo motor is restricted, and thus a position error between the position command and position feedback of the servo motor is increased;
the operation of the spindle motor is restricted, and thus the load or the drive current of the spindle motor is increased;
the oscillation of the machine tool is increased;
the sound of the machine tool is increased; or
the operation of the machine tool is restricted, and thus the sound of the machine tool is decreased.

In this way, for example, the oscillation operation intermittent execution determination unit 25 determines, due to chips generated in the machining, that the state of the machine tool not in a normal state:
when the position error between the position command and the position feedback of the servo motor exceeds a predetermined threshold value;
when the load or the drive current of the spindle motor exceeds a predetermined threshold value;
when the detection oscillation of the oscillation sensor S1 exceeds a predetermined threshold value; or
when the detection sound of the sound sensor S2 falls outside a predetermined range. These predetermined threshold values may be previously stored in the storage unit 29.

Alternatively, when it is estimated that the state of the machine tool is not normal due to chips generated in the machining, for example, when it is estimated that chips continuously become entangled in the tool and thus normal turning is not performed, the oscillation operation intermittent execution determination unit 25 determines that the oscillation operation is enabled. On the other hand, when it is estimated the state of the machine tool is normal, the oscillation operation intermittent execution determination unit 25 determines that the oscillation operation is disabled.

For example, the oscillation operation intermittent execution determination unit 25 estimates the state of the machine tool based on the execution information of the machining program.

For example,
when the relative machining distance between the workpiece and the tool is increased;
when the machining time of the workpiece is increased; or
when the amount of machining of the workpiece is increased, it is estimated that chips continuously become entangled in the tool.

In this way, for example, the oscillation operation intermittent execution determination unit 25 estimates that the state of the machine tool 10 is not normal due to chips generated in the machining:
when the relative machining distance between the workpiece and the tool exceeds a predetermined threshold value;
when the machining time of the workpiece exceeds a predetermined threshold value; or
when the amount of machining of the workpiece exceeds a predetermined threshold value.

These predetermined threshold values may be previously stored in the storage unit. The machining distance, the machining time and the amount of machining may be initialized to zero when oscillation occurs. The machining distance, the machining time and the amount of machining may be set to a total amount, and thus it may be estimated, at intervals of threshold values, that the state of the machine tool 10 is not normal.

When the oscillation operation intermittent execution determination unit 25 determines that the oscillation operation is enabled, the oscillation command calculation unit 23 described above calculates the oscillation command described above whereas when the oscillation operation intermittent execution determination unit 25 determines that the oscillation operation is disabled, the oscillation command calculation unit 23 does not calculate the oscillation command described above. The control unit 26 described above includes the adder 26a so as to add the position command and the oscillation command together.

As described above, in the controller 20 of the machine tool according to the first embodiment, since it is possible to intermittently perform the oscillation operation even in the machining block of the machining program, that is, since it is possible to switch the enabling/disabling (on/off) of the oscillation operation, the number of times the oscillation is performed can be reduced, with the result that it is possible to reduce the burden on the machine tool 10.

Incidentally, the enabling/disabling of the oscillation operation can be set not only by the machining program command described previously but also by the I/O signal of the PLC. However, when the enabling/disabling of the oscillation operation is set by the I/O signal of the PLC, the start/completion of the oscillation operation is delayed only by the processing time of the I/O signal. Moreover, a significant burden is placed on the production of a ladder program and the like in the PLC. In this respect, the controller 20 of the machine tool according to the first embodiment does not depend on the I/O signal of the PLC, and thus the start/completion of the oscillation operation is prevented from being delayed.

Second Embodiment

Although in the first embodiment, the form in which the oscillation machining is performed in the turning is illustrated, in a second embodiment, a form in which the oscillation machining is performed in drilling will be illustrated.

Figure 4:
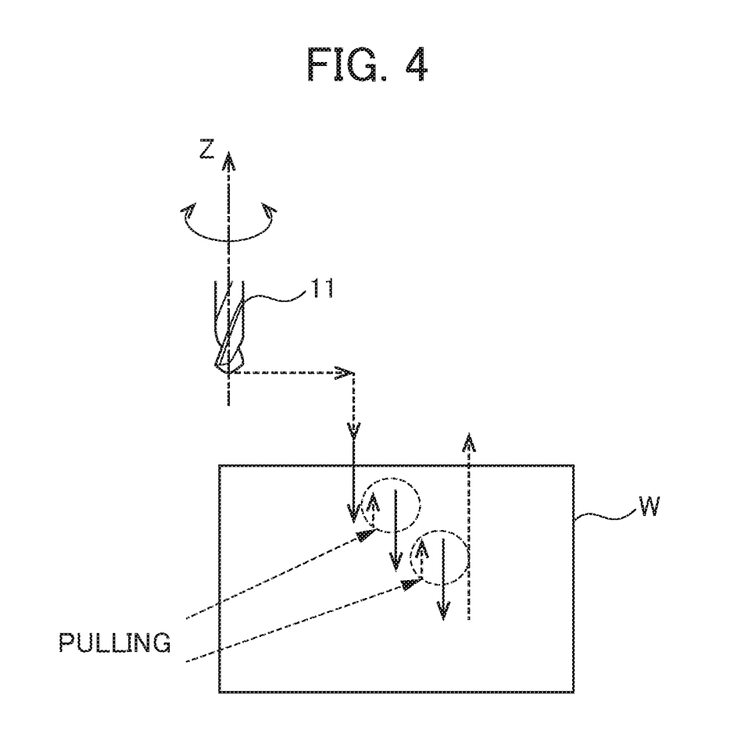
FIG. 4 is a diagram for illustrating conventional drilling.

FIG. 4 is a diagram for illustrating conventional drilling. As shown in FIG. 4, in the conventional drilling, the tool 11 is rotated about the Z axis with the spindle motor, and the tool 11 is moved in the direction of the Z axis (in this case, the direction of the machining) with the servo motor. In the drilling as described above, there is a command called a high speed deep drilling cycle in which cutting is performed a certain amount (solid line) and in which thereafter pulling is slightly performed (broken line).

Figure 5:
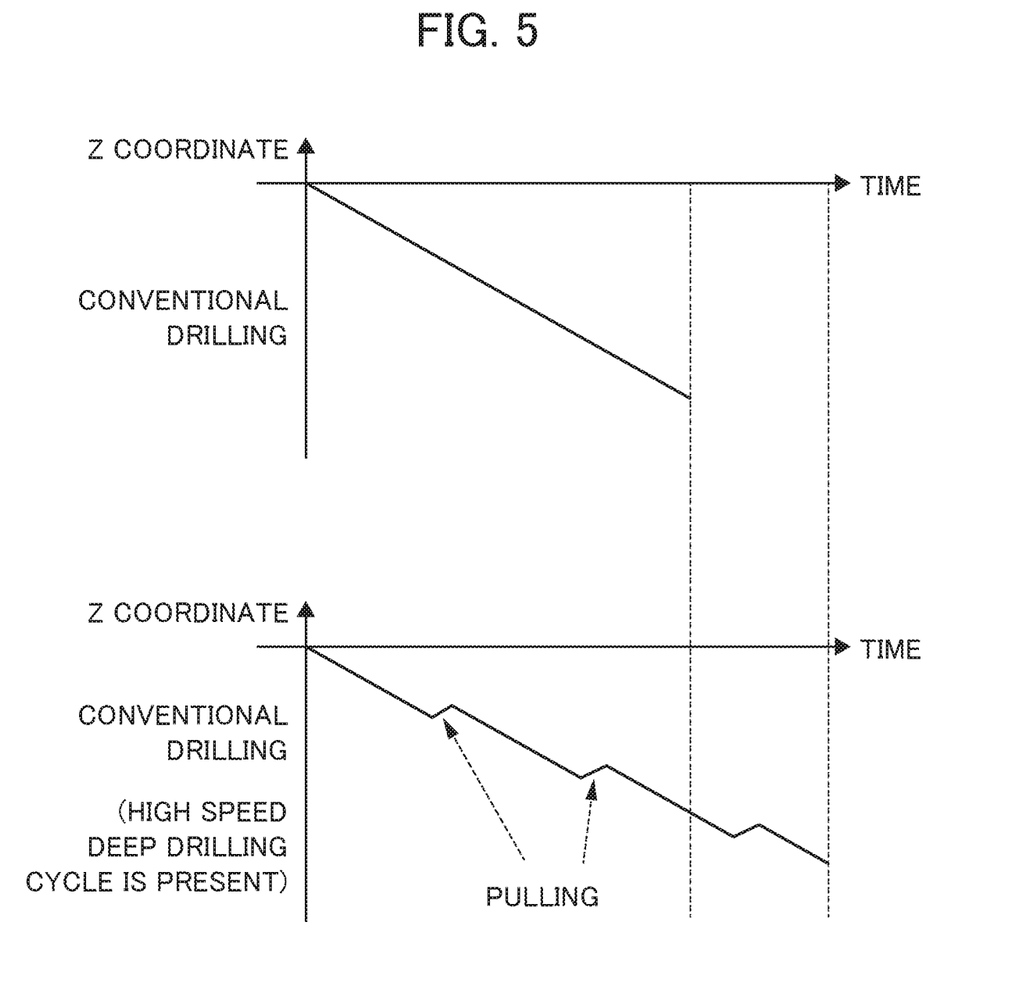
FIG. 5 is a diagram showing a cycle time in the conventional drilling.

Although even in the drilling having the high speed deep drilling cycle, chips can be subdivided, as shown in FIG. 5, the cycle time is extended, and thus the machining time is extended. In the drilling as described above, instead of the high speed deep drilling cycle, the oscillation operation of the present disclosure is used, and thus it is possible to prevent the cycle time from being extended.

The configuration of the controller 20 of the machine tool according to the second embodiment is the same as the configuration of the controller 20 of the machine tool shown in FIGS. 1 and 2 and according to the first embodiment. The controller 20 of the machine tool according to the second embodiment differs from the controller 20 of the machine tool according to the first embodiment in that the drilling is performed instead of the turning. In the position command calculation unit 22, the position command of the conventional drilling without provision of the pulling operation when the high speed deep drilling cycle is performed is calculated. The controller 20 of the machine tool according to the second embodiment differs from the controller 20 of the machine tool according to the first embodiment in the function and the operation of the oscillation operation intermittent execution determination unit 25.

Figure 6:
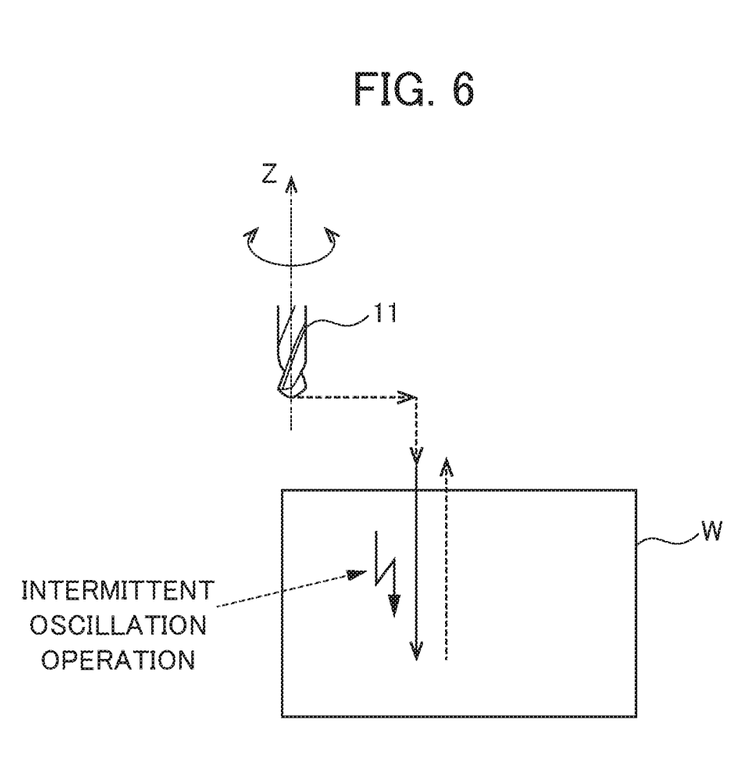
FIG. 6 is a diagram for illustrating drilling (including an intermittent oscillation operation) using the controller of the machine tool according to the present embodiment.

The oscillation operation intermittent execution determination unit 25 has the function and the operation of the oscillation operation intermittent execution determination unit 25 described above. Furthermore, the oscillation operation intermittent execution determination unit 25 analyzes the machining program, and determines that the oscillation operation described above is enabled in a period during which in the drilling block of the machining program, the conventional high speed deep drilling cycle commands the operation of pulling back the tool 11. On the other hand, in a period other than the period during which in the drilling block of the machining program, the conventional high speed deep drilling cycle commands the operation of pulling back the tool 11, the oscillation operation intermittent execution determination unit 25 determines that the oscillation operation is disabled (FIG. 6). In other words, the oscillation operation intermittent execution determination unit 25 determines whether or not the oscillation operation is intermittently performed.

Even the controller 20 of the machine tool according to the second embodiment has the same advantage as the controller 20 of the machine tool according to the first embodiment. Specifically, even in the machining block of the machining program, since it is possible to intermittently perform the oscillation operation, that is, since it is possible to switch the enabling/disabling (on/off) of the oscillation operation, the number of times the oscillation is performed can be reduced, with the result that it is possible to reduce the burden on the machine tool 10. The controller 20 of the machine tool according to the first embodiment does not depend on the I/O signal of the PLC, and thus the start/completion of the oscillation operation is prevented from being delayed.

Figure 7:
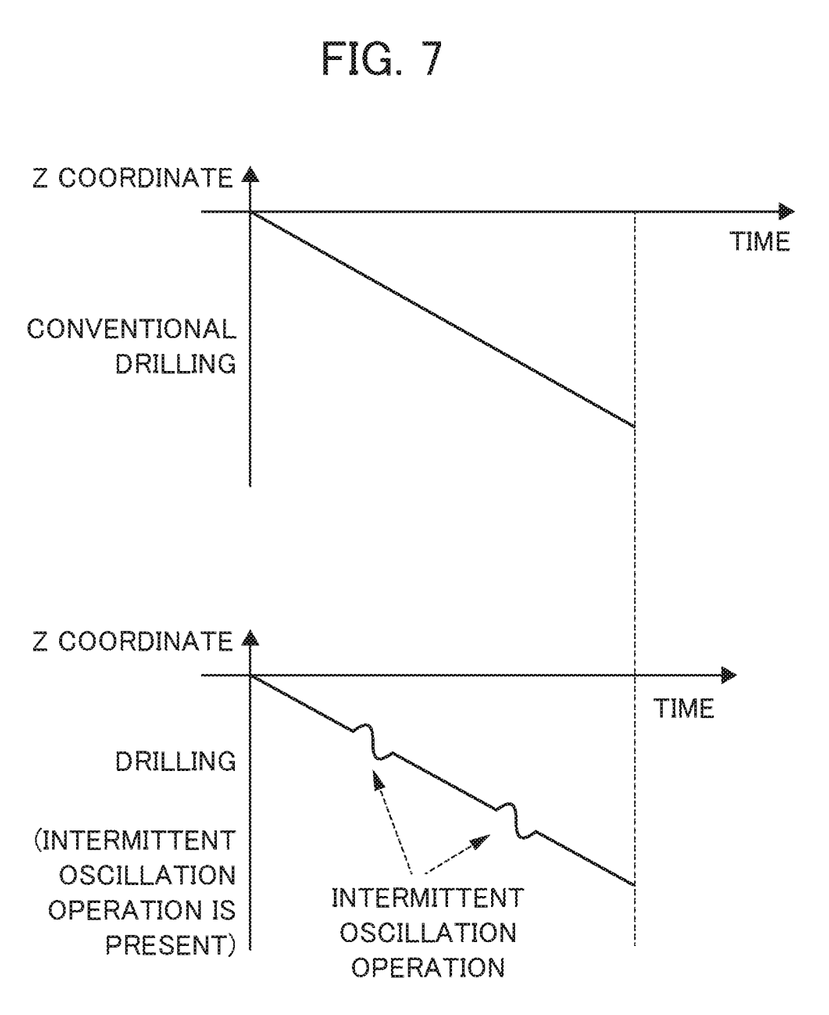
FIG. 7 is a diagram showing a cycle time of the drilling (including the intermittent oscillation operation) using the controller of the machine tool according to the present embodiment.

Furthermore, in the controller 20 of the machine tool according to the second embodiment, as shown in FIG. 7, the cycle time is prevented from being extended, and thus the machining time is prevented from being extended.

Although the embodiments of the present invention are described above, the present invention is not limited to the embodiments described above, and various modifications and variations are possible. For example, although in the embodiment described above, the numerical controller of the machine tool which performs the turning or the drilling is illustrated, the present disclosure is not limited to this configuration, and can be applied to controllers of machine tools which perform various types of machining.

Although in the first embodiment described above, the configuration is illustrated in which the workpiece W is rotated, and in which simultaneously, the tool 11 is oscillated along the generatrix of the outer circumferential surface of the workpiece W, the present disclosure is not limited to this configuration. The machine tool according to the first embodiment of the present disclosure preferably has a configuration in which the machine tool controls the spindle M0 for relatively rotating the workpiece W and the tool 11 about the center axis line of the workpiece W, at least one of the feed axes M1 and M2 for relativity feeding the workpiece W and the tool 11 in the direction of the machining along the center axis line and the like so as to machine the workpiece W. For example, a configuration in which the tool 11 is rotated about the center axis line of the workpiece W and in which the workpiece W is oscillated with respect to the tool 11 or a configuration in which the workpiece W is rotated and in which the workpiece W is oscillated with respect to the tool 11 in a direction along the generatrix of the outer circumferential surface of the workplace W can be assumed. In the present disclosure, a machining method of cutting the workpiece W by the rotation of the tool 11 about the center axis line of the workpiece W is also one type of machining. Although in the second embodiment, the configuration is illustrated in which the oscillation is performed in the drilling, the present disclosure is not limited to this configuration. A configuration such as a machining center or a grinding machine may be adopted.

EXPLANATION OF REFERENCE NUMERALS

1 machining system
10 machine tool
11 tool
20 controller
22 position command calculation unit
23 oscillation command calculation unit
24 oscillation operation execution determination unit
25 oscillation operation intermittent execution determination unit
26 control unit
26a adder
29 storage unit
M0 spindle (spindle motor)
M1, M2 feed axis (servo motor)
W workpiece

What is claimed is:

1. A controller of a machine tool which machines, while relatively oscillating a workpiece and a tool, the workpiece so as to subdivide chips generated in the machining, the controller comprising:
    a position command calculation unit which calculates a position command for relatively moving the workpiece and the tool;
    an oscillation operation execution determination unit which analyzes a machining program for machining the workpiece and which determines whether or not an oscillation operation of relatively oscillating the workpiece and the tool is performed in a machining block of the machining program;
    an oscillation operation intermittent execution determination unit which determines whether the oscillation operation is enabled or disabled based on a state of the machine tool to alternately switch enabling/disabling of the oscillation operation between conventional machining operations during the machining block of the machining program when the oscillation operation execution determination unit determines that the oscillation operation is performed;
    an oscillation command calculation unit which calculates, when the oscillation operation intermittent execution determination unit determines that the oscillation operation is enabled, an oscillation command for relatively oscillating the workpiece and the tool; and
    an adder which adds the position command and the oscillation command together.

2. The controller of the machine tool according to claim 1, wherein when the state of the machine tool is not normal due to the chips generated in the machining, the oscillation operation intermittent execution determination unit determines that the oscillation operation is enabled.

3. The controller of the machine tool according to claim 2, wherein based on feedback information of a servo motor or a spindle motor in the machine tool, feedback information of an oscillation sensor which detects oscillation of the machine tool or feedback information of a sound sensor which detects sound of the machine tool, the oscillation operation intermittent execution determination unit determines that the machine tool is not in a normal state due to the chips generated in the machining
    when a position error between the position command and position feedback of the servo motor exceeds a first predetermined threshold value,
    when a load or a drive current of the spindle motor exceeds a second predetermined threshold value,
    when a detection oscillation of the oscillation sensor exceeds a third predetermined threshold value or
    when a detection sound of the sound sensor falls outside a predetermined range.

4. The controller of the machine tool according to claim 1, wherein when it is estimated that the state of the machine tool is not normal due to the chips generated in the machining, the oscillation operation intermittent execution determination unit determines that the oscillation operation is enabled.

5. The controller of the machine tool according to claim 4, wherein when a relative machining distance between the workpiece and the tool exceeds a fourth predetermined threshold value,
    when a machining time of the workpiece exceeds a fifth predetermined threshold value or
    when an amount of machining of the workpiece exceeds a sixth predetermined threshold value, the oscillation operation intermittent execution determination unit estimates, based on execution information of the machining program, that the state of the machine tool is not normal due to the chips generated in the machining.

6. The controller of the machine tool according to claim 1, wherein when a program of drilling for performing a pull-back operation is executed, the oscillation operation intermittent execution determination unit determines that the oscillation operation is enabled without performing the pull-back operation.

* * * * *